United States Patent [19]
Fujii et al.

[11] 4,188,370
[45] Feb. 12, 1980

[54] THERMOCHEMICAL METHOD FOR PRODUCING HYDROGEN FROM WATER

[75] Inventors: Kinjiro Fujii, Komae; Wakichi Kondo, Isehara; Toshiya Kumagai, Tokyo, all of Japan

[73] Assignee: Agency of Industrial Science & Technology, Tokyo, Japan

[21] Appl. No.: 913,746

[22] Filed: Jun. 8, 1978

[30] Foreign Application Priority Data

Jun. 10, 1977 [JP] Japan ................... 52/68681

[51] Int. Cl.$^2$ .................. C01B 1/05; C01B 13/02
[52] U.S. Cl. ....................... 423/579; 423/658
[58] Field of Search ................ 423/579, 657, 658

[56] References Cited
U.S. PATENT DOCUMENTS

| | | | |
|---|---|---|---|
| 3,939,257 | 2/1976 | Pangborn et al. | 423/579 X |
| 3,998,942 | 12/1976 | Pangborn et al. | 423/658 |
| 4,039,651 | 8/1977 | Knoche et al. | 423/658 X |

FOREIGN PATENT DOCUMENTS 2260599  6/1974  Fed. Rep. of Germany ........... 423/658
2541824  3/1977  Fed. Rep. of Germany ........... 423/658

Primary Examiner—Edward J. Meros
Attorney, Agent, or Firm—Armstrong, Nikaido, Marmelstein & Kubovcik

[57] ABSTRACT

A closed system for obtaining hydrogen from water is provided by combining a first step of obtaining hydrogen by reacting water and ferrous halide, a second step of converting triiron tetraoxide produced as a by-product in the first step to ferrous sulfate, a third step of obtaining oxygen and by-products by thermally decomposing said ferrous sulfate, and a fourth step of returning said by-products by thermally decomposing said ferrous sulfate, and a fourth step of returning said by-products obtained in the third step to any of the previous steps.

14 Claims, 4 Drawing Figures

THERMOCHEMICAL METHOD FOR PRODUCING HYDROGEN FROM WATER

BACKGROUND OF THE INVENTION

The present invention relates to a thermochemical method for producing hydrogen from water.

Recently, the shortage of petroleum resources has become a serious problem and, in the field of hydrogen manufacturing industry, in which hereinbefore petroleum has been mainly used as a source of hydrogen, the movement of changing the source from petroleum to water has appeared. As one of the methods for producing hydrogen, there has been an electrolysis of water from of oil. However, since electric power itself is being obtained mainly from petroleum, the electrolysis method may become a problem as well as the case of using directly hydrocarbons as the source of hydrogen when petroleum is dried up. Therefore, a method of using water as a raw material without electric power has been required and, hereinbefore, there have been some proposals. However, a completely closed system in which hydrogen and oxygen are obtained from water and other by-products are not discharged out of the system has not been sufficiently established. It is very important to keep heat energy used in the closed system down as a whole by utilizing thermochemical energy. The known methods have to be improved in this regard. In this field, those skilled in the art have made efforts to establish a closed system with a lowered heat energy consumption.

From such a viewpoint, the present invention aims at establishment of a closed system in which water is used as a raw material but an electrolysis method is not utilized and heat energy consumption is very low.

OBJECTS OF THE INVENTION

An object of the present invention is to provide a method for producing hydrogen by using water as a raw material.

Another object of the present invention is to provide a method for producing hydrogen and oxygen by a closed system using water as a raw material.

Other objects and advantages will appear from the following description.

BRIEF SUMMARY OF THE INVENTION

The objects of the present invention are achieved by combining the following steps containing a novel reaction step:

(1) A first step in which triiron tetraoxide, hydrogen halide and hydrogen are produced by reacting water and ferrous halide;

(2) a second step in which said triiron tetraoxide obtained in the first step is converted to ferrous sulfate;

(3) a third step in which said ferrous sulfate obtained in the second step is decomposed to produce diiron trioxide, sulfur dioxide and oxygen;

(4) a step in which said hydrogen produced in the first step is recovered and said hydrogen halide is transferred to any of the steps later than the first step; and (5) a step in which said ferrous halide produced in the second step is returned to the first step, a step in which said diiron trioxide and sulfur dioxide produced in the third step are returned to the second step, and a step in which oxygen is recovered.

DETAILED DESCRIPTION OF THE INVENTION

The method of the present invention is explained in accordance with the drawings.

Figure 1:
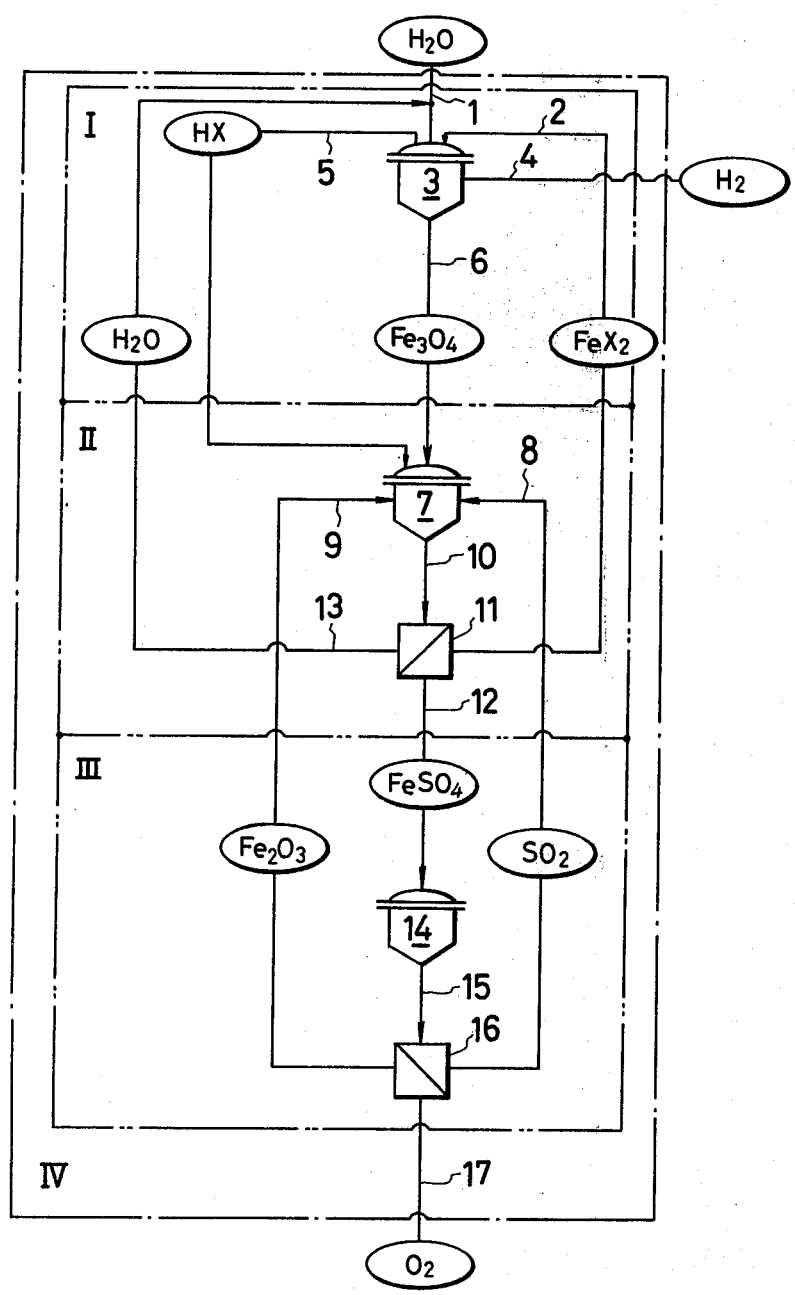
FIGS. 1 to 4 are flow sheets, showing that the present invention can be practiced in various embodiments.

Firstly, one of the typical cases is explained in accordance with FIG. 1.

The raw material in practicing the method of the present invention is water (hereinafter abbreviated as "$H_2O$") and the reaction of obtaining hydrogen (hereinafter abbreviated as "$H_2$") therefrom is ultimately shown as follows:

$$H_2O \rightarrow H_2 + \tfrac{1}{2}O_2 \tag{1}$$

Therefore, in the closed system of the present invention in which $H_2$ is produced from $H_2O$, oxygen (hereinafter abbreviated as "$O_2$") is produced as a by-product. $H_2O$ supplied through line 1 and ferrous halide (hereinafter abbreviated as "$FeX_2$", in which X stands for halogen) supplied through line 2 are reacted in the reactor 3 to produce triiron tetraoxide (hereinafter abbreviated as "$Fe_3O_4$"), hydrogen halide (hereinafter abbreviated as "HX") and $H_2$. The reaction proceeds in accordance with the following equation:

$$3FeX_2 + 4H_2O \rightarrow Fe_3O_4 + 6HX + H_2 \tag{2}$$

The reaction is carried out at a temperature of more than 500° C., more preferably 600°–700° C., and under reduced or elevated pressure, preferably 1–3 kg/cm² (abs.). $H_2O$ is preferably supplied in a form of super heated water steam into the reactor 3 through line 1.

From the reactor 3, $H_2$ and HX are generated. $H_2$ and HX are separated from each other (the separator is not shown) and taken out. Also, $Fe_3O_4$ is taken out through line 6 from the reactor 3.

The above mentioned reaction step is called the first step in the present invention and shown as I surrounded by an alternate long, short and short dash line in FIG. 1 (the same as this applies in the following drawings).

$Fe_3O_4$ produced in the first step is transferred to the reactor 7. Into the reactor 7, HX generated in the reactor 3 is transferred through line 5, and $SO_2$ is supplied thereto through line 8 and $Fe_2O_3$ is supplied thereto through line 9, respectively. The following reaction takes place in the reactor 7:

$$Fe_3O_4 + Fe_2O_3 + 2SO_2 + 6HX \rightarrow 3FeX_2 + 2FeSO_4 + 3H_2O \tag{3}$$

The above reaction is preferably carried out under the following conditions: The reaction pressure is more than 1 kg/cm² (abs.), more preferably 5–20 kg/cm² (abs.). The reaction temperature is more than room temperature, more preferably 100°–600° C. The amounts of $SO_2$ and HX are more than their stoichiometrical amounts or theoretical amounts, for example, $SO_2$ is 1–5 times, more preferably 1.5–3 times, the theoretical amount and HX is 1–5 times, more preferably 1–3 times, the theoretical amount.

The reaction products obtained in the above reaction are transferred from the reactor 7 through line 10 into the separator 11 and they are therein separated to $FeX_2$, $FeSO_4$ and $H_2O$.

The above mentioned reaction step is called the second step in the present invention and shown as II surrounded by an alternate long, short and short dash line in FIG. 1 (the same as this applies in the following drawings). This step is a step of converting $Fe_3O_4$ to $FeSO_4$ and, as is mentioned hereinafter, various embodiments may be included.

$FeX_2$ separated by means of the separator 11 is returned into the reactor 3 of the first step through line 2 and $FeSO_4$ is transferred into the following third step through line 12. $H_2O$ is returned into the reactor 3 of the first step through line 13.

$FeSO_4$ taken out of the separator 11 is then supplied into the reactor 14 and is subjected to thermal decomposition in accordance with the following equation.

$$2FeSO_4 \rightarrow Fe_2O_3 + 2SO_2 + \tfrac{1}{2}O_2 \qquad (4)$$

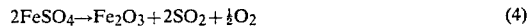

$Fe_2O_3$, $SO_2$ and $O_2$ produced by thermal decomposition are transferred through line 15 into the separator 16 to be separated and $Fe_2O_3$, through line 9, and $SO_2$, through line 8, are returned into the reactor 7 of the second step. $O_2$ may be separated as a final product and taken out through line 17.

The above mentioned step is called the third step in the present invention and shown as III surrounded by an alternate long, short and short dash line in FIG. 1 (the same as this applies in the following drawings).

The decomposition reaction of the third step is preferably carried out as a temperature of more than 650° C., more preferably 700°–900° C. and at a pressure of 0.1–3 kg/cm² (abs.).

The method for producing hydrogen from water in the present invention is completed as a closed system by combining the above mentioned steps.

The closed system of the present invention is shown as IV surrounded by an alternate long and short dash line in FIG. 1 (the same as this applies in the following drawings).

Figure 2:
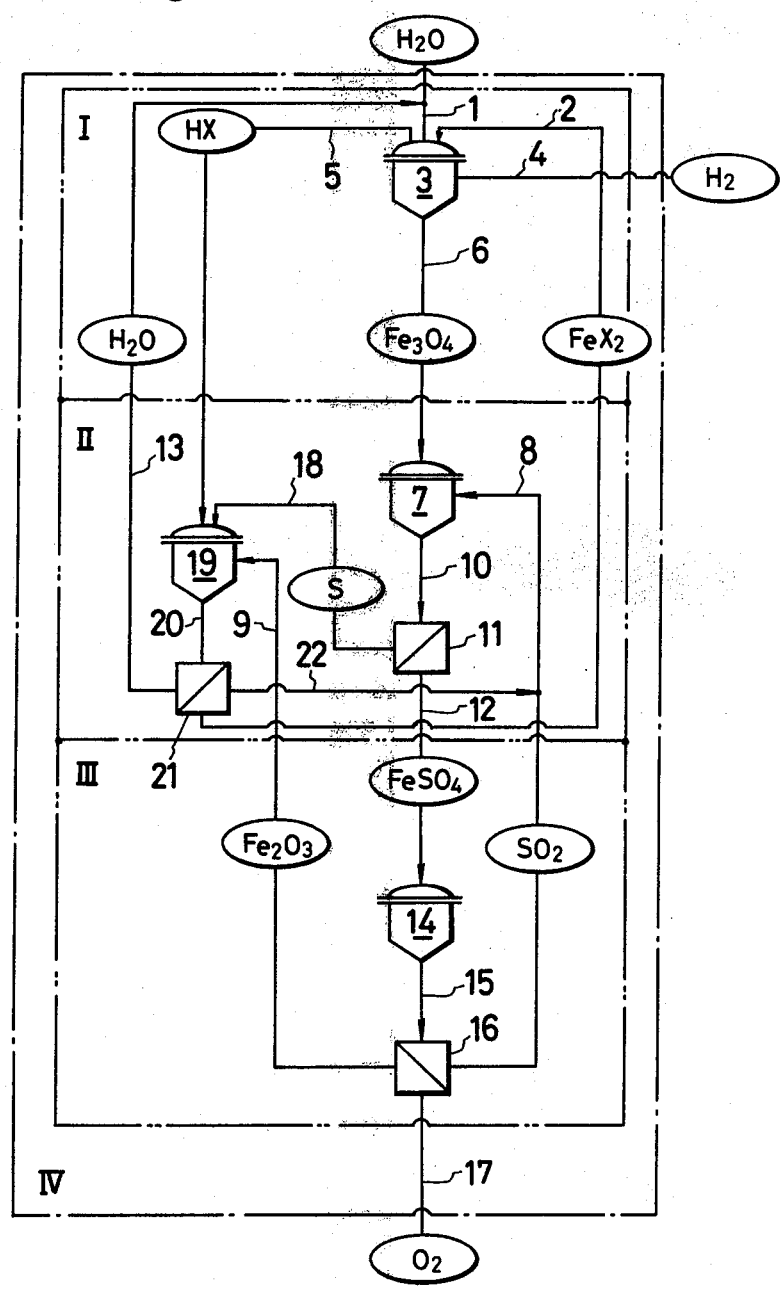

Moreover, according to the present invention, the embodiment, especially the second step, shown in FIG. 1, may be replaced by other embodiment. That is, even though $Fe_2O_3$ generated in the third step is not directly supplied into the reactor 7 in the second step shown in FIG. 1, $FeSO_4$ can be produced. This method is explained in accordance with FIG. 2. In this method, the yield of S is better than in other methods mentioned below and accordingly S is produced in excess. Therefore, it is preferable that S produced in excess is converted to $SO_2$ by $O_2$ which is one of the products of the present invention and the $SO_2$ thus produced is recycled.

Firstly, $Fe_3O_4$ and $SO_2$ are supplied into the reactor 7 and the following reaction is carried out:

$$Fe_3O_4 + 4SO_2 \rightarrow 3FeSO_4 + S \qquad (5)$$

This reaction is preferably carried out by the following conditions.

The reaction pressure is more than 1 kg/cm² (abs.), more preferably 5–20 kg/cm² (abs.). The reaction temperature is more than 300° C., more preferably 400°–800° C.

The amount of $SO_2$ is 1.5–5.0 times, more preferably 1.5–3 times, the theoretical amount.

As a reaction accelerator, $H_2O$ and HX (X=Cl, Br) are used.

The reaction products are separated by means of a separator 11 and $FeSO_4$ is, as shown above, transferred to the third step, and S is transferred through line 18 into the reactor 19 and therein reacted with $Fe_2O_3$ generated in the third step and HX generated in the first step.

The reaction is shown as the following equation:

$$\tfrac{1}{2}S + Fe_2O_3 + 4HX \rightarrow 2FeX_2 + \tfrac{1}{2}SO_2 + 2H_2O \qquad (6)$$

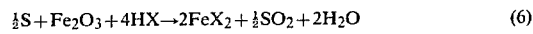

This reaction is preferably carried out by the following conditions:

The reaction pressure is more than 1 kg/cm² (abs.), more preferably 5–20 kg/cm² (abs.). The reaction temperature is more than 300° C., more preferably 400°–600° C.

The amount of sulfur is 1–5 times, more preferably 1–2 times, the theoretical amount.

The amount of HX is 1–5 times, more preferably 1.5–3 times, the theoretical amount.

The reaction products thus obtained are transferred through line 20 into the separator 21 and separated into $FeX_2$, $SO_2$ and $H_2O$. $FeX_2$ thus separated is returned through line 2 into the reactor 3 and $H_2O$ is returned through line 13 into the reactor 3.

The remaining reaction product, $SO_2$, is joined with line 8 through line 22 to be returned into the reactor 7.

In the present invention, the above mentioned step is also one embodiment of the second step.

In the third step, as in the case of FIG. 1, $FeSO_4$ is thermally decomposed to produce $Fe_2O_3$, $SO_2$ and $O_2$. $Fe_2O_3$ thus produced is transferred into the reactor 19 of the second step through line 9.

Figure 3:
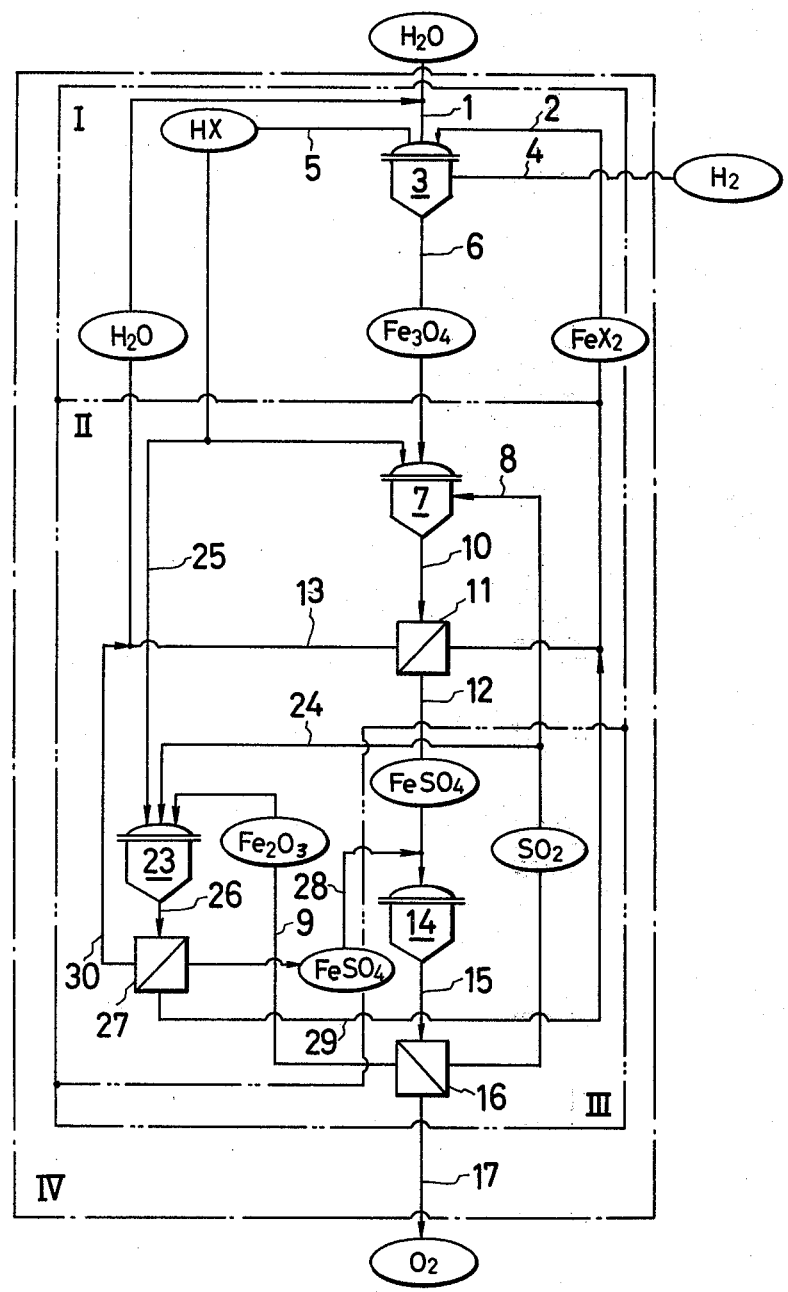

The third embodiment is that $Fe_2O_3$ generated in the third step is converted to $FeSO_4$ and $FeX_2$ in the presence of $SO_2$ and $FeX_2$ thus obtained is returned to the first step and $FeSO_4$ is subjected to thermal decomposition. This embodiment is a typical embodiment of the present invention shown in FIG. 1. This embodiment is shown in FIG. 3. That is, $Fe_2O_3$ generated in the third step is separated by means of the separator 16 and put in the reactor 23 through line 9. Into the reactor 23, $SO_2$ and HX are also supplied in which $SO_2$ is through lines 8 and 24 and HX is through lines 5 and 25.

The reaction taken place in the reactor 23 is shown as the following equation:

$$Fe_2O_3 + SO_2 + 2HX \rightarrow FeX_2 + FeSO_4 + H_2O \qquad (7)$$

The reaction products thus produced are supplied into the separator 27 through line 26 to be separated to $FeSO_4$, $FeX_2$ and $H_2O$. $FeSO_4$ thus separated is supplied into the reactor 14 through line 28, $FeX_2$ is joined into line 2 through line 29 and $H_2O$ is joined into line 13 through line 30.

The above mentioned reaction is preferably carried out by the following conditions: The reaction pressure is more than 1 kg/cm² (abs.), more preferably 5–20 kg/cm² (abs.). The reaction temperature is more than room temperature, more preferably 100°–600° C. The amounts of $SO_2$ and HX are more than the theoretical amounts, for example, the amount of $SO_2$ is 1–5 times, more preferably 1.5–3 times, the theoretical amount and the amount of HX is 1–5 times, more preferably 1–3 times.

Hereinbefore, the case in which $SO_2$ is supplied into the reactor 7 of the second step is explained, but it is also possible that S is supplied in place of $SO_2$ into the reactor 7 to produce $SO_2$. In other words, it is possible to carry out the following reaction in the second step:

$$Fe_3O_4 + \tfrac{1}{2}S + 6HX \rightarrow 3FeX_2 + \tfrac{1}{2}SO_2 + 3H_2O \qquad (8)$$

This reaction is preferably carried out by the following conditions: The reaction pressure is more than 1 kg/cm$^2$ (abs.), more preferably 5–20 kg/cm$^2$ (abs.). The reaction temperature is more than 300° C., more preferably 400°–600° C. The amount of S is 1–5 times, more preferably 1–2 times, the theoretical amount. The amount of HX is 1–5 times, more preferably 1.5–3 times, the theoretical amount.

Figure 4:
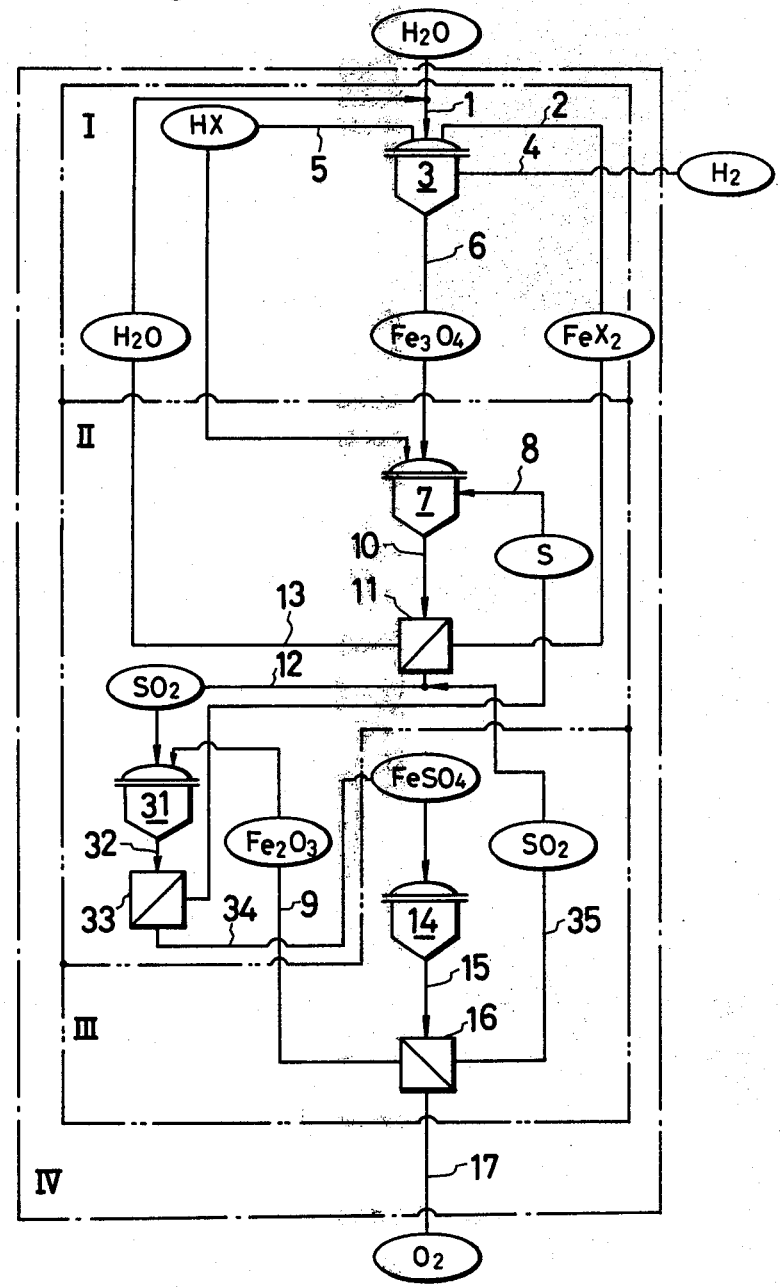

This reaction is shown in FIG. 4. Into the reactor 7, S is supplied through line 8 to be reacted and the reaction products obtained are separated by means of the separator 11 and then $FeX_2$ and $H_2O$ are returned into the reactor 3 of the first step. $SO_2$ is supplied into the reactor 3 and $Fe_2O_3$ generated in the third step is also supplied into the reactor 31 through line 9. Thereupon, the following reaction takes place in the reactor 31.

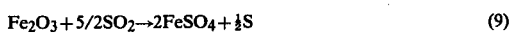

$$Fe_2O_3 + 5/2 SO_2 \rightarrow 2FeSO_4 + \tfrac{1}{2}S \qquad (9)$$

This reaction is preferably carried out by the following conditions.

The reaction pressure is more than 1 kg/cm$^2$ (abs.), more preferably 5–20 kg/cm$^2$ (abs.). The reaction temperature is more than 300° C., more preferably 400°–800° C.

The amount of $SO_2$ is 1.5–5 times, more preferably 1.5–3 times, the theoretical amount. As reaction accelerators, $H_2O$ and HX (X=Cl, Br) are used.

The reaction products thus obtained are transferred through line 32 into the separator 33 and $FeSO_4$ thus separated is supplied through line 34 to the third step and S is returned through line 8 into the reactor 7 of the second step.

In the third step, $FeSO_4$ is thermally decomposed and $SO_2$ thus obtained is recycled through line 35 into the reactor 31 and $Fe_2O_3$ is recycled into the reactor 31 and it results in that $Fe_3O_4$ is converted to $FeSO_4$ in the second step. In other words, this embodiment means that $SO_2$ generated in the second step is indirectly converted to $FeSO_4$ and $FeSO_4$ thus otained is thermally decomposed in the third step.

The above explanation is made for explaining the basic technical concept of the present invention and when the present invention is actually practiced, sometimes the reactor and the separator may not be distinguished and sometime two or more separators may be used. Various arrangements of apparatus and various conditions may be easily selected in order to complete the closed system. For instance, both of the reaction products and the unreacted compounds may be recycled by means of a recycle system and recycle pump provided outside the reactor.

EXAMPLE 1

Into a platinum reactor 3, 3 m mole $FeCl_2$ and 10 m mole of water steam were supplied and they were reacted at 650°–700° C. and about 1 kg/cm$^2$ (abs.). Thereafter, 1 m mole of $H_2$, 6 m mole of HCl and 1 m mole of $Fe_3O_4$ were obtained. (The above is the first step.)

Then, 1 m mol of $Fe_3O_4$ obtained in the above reaction and 1 m mol of $Fe_2O_3$ obtained in the after mentioned third step were put into a quartz tube reactor 7 (inner diameter 15 mm, volume about 40 ml), while chilling it in liquid nitrogen, $SO_2$ of 3 times the theoretical amount and HCl gas of 1.5 times the theoretical amount were added thereto, the quartz tube is heat sealed and they were maintained at 200° C., 350° C. and 550° C. for about 3 hours to be reacted. In every case, iron oxide of the raw material was reacted with a reaction rate of more than 95% to produce $FeCl_2$ and $FeSO_4$. (The above is the second step.)

Then, ferrous sulfate obtained in the second step was put in the platinum boat reactor 14 and heated at 900° C. in an electric furnace in an atmosphere of $N_2$ of about 1 kg/cm$^2$ (abs.) to be thermally decomposed and $Fe_2O_3$ of 1 m mole, $SO_2$ of 2 m mole and $O_2$ of 0.5 m mole were obtained. (The above is the third step.)

In the above experiment, the yield of $FeCl_2$ obtained in the second step was almost equal to the amount of $FeCl_2$ used in the first step. Also, the yields of $Fe_2O_3$ and $SO_2$ obtained in the third step were almost equal to the amounts of $Fe_2O_3$ and $SO_2$ used in the second step.

Independently of the experiment of the second step, using a mixture of 1 m mol of $Fe_2O_3$ and 1 m mole of $Fe_3O_4$ as a starting material, $SO_2$ and hydrochloric acid (concentration of HCl, 35% by weight) were added thereto and the reaction was carried out, as mentioned above, in the presence of water at 200° C. for 3 hours. The reaction rate was 70% in a basis of $Fe_2O_3$. This reaction rate was a value obtained under the stationary condition and therefore it seems that the reaction rate may be increased by stirring or shaking.

The separation experiments of the reaction products obtained in the reactor 7 of the second step were separately carried out in accordance with the following two methods:

The first method 20 g of $FeSO_4 \cdot 7H_2O$ and 50 g of $FeCl_2 \cdot 4H_2O$ were added into 10 ml of water and heated to eliminate a little of water and thereafter they showed a constant boiling point at about 120° C.

According to the liquid phase analysis at this time, the concentration of iron component was 22% by weight and the concentration of sulfate was 0.9% by weight. These facts mean that the sulfate in all the iron salts present in the liquid phase was only 2.4% by mole and $FeCl_2$ was selectively dissolved in the liquid phase.

The second method 10 g of $FeSO_4$ (anhydride) and 10 g of $FeCl_2$ (anhydride) were added into 100 ml of ethyl alcohol and heated at about 50° C. $FeCl_2$ was completely dissolved in the alcohol but $FeSO_4$ was not dissolved at all. After separating $FeSO_4$ by filtration, the alcohol solution of $FeCl_2$ was distilled in an atmosphere of $N_2$ to obtain 10 g of $FeCl_2$ solid.

EXAMPLE 2

A reaction of the first step was carried out in the same manner set forth in Example 1 and 1 m mol of $Fe_3O_4$ was obtained (the first step).

Then, with the $Fe_3O_4$ thus obtained, 12 m mol of $SO_2$ were reacted, using about 3 m mole of $H_2O$ and about 1 m mole of HCl as reaction accelerators, at about 650° C. and about 10 kg/cm$^2$ (abs.) to obtain 3 m mole of $FeSO_4$ and 1 m mole of S. The obtained S was reacted with HCl and $Fe_2O_3$ in the reactor 19 to obtain 3 m mole of $FeCl_2$, $\tfrac{3}{4}$ m mole of $SO_2$ and 3 m mole of $H_2O$ (the second step).

The resulting $FeCl_2$ was transferred into the reactor 3 of the first step and hydrolysed to yield again $Fe_3O_4$, HCl and $H_2$.

$FeSO_4$ obtained in the second step was reacted in the third step to obtain 3 m mole of $SO_2$, $\frac{3}{4}$ m mole of $O_2$ and 3/2 m mole of $Fe_2O_3$.

EXAMPLE 3

A reaction of the first step was carried out in the same manner set forth in Example 1 to obtain 1 m mole of $Fe_3O_4$ (the first step). Then, $Fe_3O_4$ thus obtained, 6 m mole of HCl and 2 m mole $SO_2$ were reacted in the quartz tube reactor 7 at 350° C. for 3 hours and $Fe_3O_4$ was converted with a reaction rate of more than 95% to $FeCl_2$ and $FeSO_4$.

Then, $Fe_2O_3$ obtained in the third step, 3 m mole HCl and 2 m mole $SO_2$ were reacted in the quartz tube reactor 23 at 350° C. for 3 hours and $Fe_2O_3$ was converted to $FeCl_2$ and $FeSO_4$ (the second step). Next, $FeSO_4$ obtained in the second step was thermally decomposed in the platinum boat reactor 14 at 900° C. in an atmosphere of $N_2$ of about 1 kg/cm$^2$ (abs.) to yield 1 m mole of $Fe_2O_3$, 2 m mole of $SO_2$ and 0.5 m mole of $O_2$ (the third step).

In the above experiment, the yield of $FeCl_2$ obtained in the second step was almost equal to the amount of $FeCl_2$ used in the first step. Also, the yields of $Fe_2O_3$ and $SO_2$ were almost equal to the amounts of $Fe_2O_3$ and $SO_2$, respectively.

EXAMPLE 4

A reaction of the first step was carried out in the same manner set forth in Example 1 to obtain 1 m mole of $H_2$, 6 m mole of HCl and 1 m mole of $Fe_3O_4$ (the first step).

Then, to $Fe_3O_4$ and HCl obtained in the first step, S was added and the reaction of the second step was carried out in the reactor 7. That is, 1 m mole of $Fe_3O_4$, 1 m mole of S and 8 m mole of HCl were reacted, as in Example 1, in the quartz tube reactor at 550° l C. for 2 hours. The solid product was $FeCl_2$ only and an excess of S was remained and solidified by chilling. The obtained $SO_2$, $FeCl_2$ and $H_2O$ were 0.5 m mole, 3 m mole and 3 m mole, respectively. Next, using about 3 m mole of $H_2O$ and about 1 m mole of HCl as reaction accelerator, $SO_2$ and $Fe_2O_3$ were reacted to obtain 0.5 m mole of S and 2 m mole of $FeSO_4$ (the second step).

The resulting $FeSO_4$ was thermally decomposed in the thermal decomposition reactor 14 at 900° C. in an atmosphere of $N_2$ of about 1 kg/cm$^2$ (abs.) to obtain 0.5 m mole of $O_2$, 2 m mole of $SO_2$ and 1 m mole of $Fe_2O_3$ (the third step).

According to the above experiment, it became theoretically clear that the yield of HCl generated in the first step is equal to the amount of HCl used in the second step, the yield of $FeCl_2$ generated in the second step is equal to the amount of $FeCl_3$ necessary for the first step, the yield of S generated in the reactor 31 is equal to the amount of S necessary for the reactor 7 and the yields of $SO_2$ and $Fe_2O_3$ generated in the third step are equal to the amounts of $SO_2$ and $Fe_2O_3$ necessary for the second step, respectively.

What we claim is:

1. A thermochemical method of producing hydrogen comprising:
    (1) reacting ferrous halide and water to produce triiron tetraoxide, hydrogen halide and hydrogen;
    (2) reacting the triiron tetraoxide produced in step (1) with ferric oxide, sulfur dioxide and hydrogen halide to produce ferrous halide, ferrous sulfate and water;
    (3) thermally decomposing the ferrous sulfate produced in (2) to ferric oxide, sulfur dioxide and oxygen; and
    (4)(a) recovering the hydrogen produced in said step (1),
    (b) delivering the hydrogen halide produced in step (1) to step (2) and
    (c) recycling the ferrous halide produced in step (2) to step (1), and ferric oxide and sulfur dioxide produced in step (3) to step (2).

2. A thermochemical method of producing hydrogen comprising:
    (1) reacting ferrous halide and water to produce triiron tetraoxide, hydrogen halide and hydrogen;
    (2)(a) reacting the triiron tetraoxide produced in step (1) with sulfur dioxide in the presence of a reaction accelerator to produce ferrous sulfate and sulfur and
    (b) reacting the sulfur produced in step (2)(a) with ferric oxide and hydrogen halide to produce ferrous halide, sulfur dioxide and water;
    (3) thermally decomposing the ferrous sulfate produced in step (2)(a) to produce ferric oxide, sulfur dioxide and oxygen; and
    (4)(a) recovering the hydrogen produced in step (1),
    (b) delivering the hydrogen halide produced in step (1) to step (2)(b) and
    (c) recycling ferrous halide produced in step (2)(b) to step (1), the ferric oxide produced in step (3) to step (2)(b), and the sulfur dioxide produced in step (3) and that produced in step (2)(b) to step (2)(a).

3. A thermochemical method of producing hydrogen comprising:
    (1) reacting ferrous halide and water to produce triiron tetraoxide, hydrogen halide and hydrogen;
    (2)(a) reacting the triiron tetraoxide produced in step (1) with sulfur dioxide and hydrogen halide to produce ferrous sulfate, ferrous halide and water and
    (b) reacting ferric oxide, sulfur dioxide and hydrogen halide to produce ferrous halide, ferrous sulfate and water;
    (3) thermally decomposing the ferrous sulfate produced in steps (2)(a) and (2)(b) to produce ferric oxide, sulfur dioxide and oxygen; and
    (4)(a) recovering hydrogen produced in step (1),
    (b) delivering the hydrogen halide produced in step (1) to steps (2)(a) and (2)(b) and
    (c) recycling ferrous halide produced in steps (2)(a) and (2) (b) to step (1), the sulfur dioxide produced in step (3) to steps (2)(a) and (2)(b), and ferric oxide produced in step (3) to step (2)(b).

4. A thermochemical method of producing hydrogen comprising:
    (1) reacting ferrous halide and water to produce triiron tetraoxide, hydrogen halide and hydrogen
    (2)(a) reacting the triiron tetraoxide produced in step (1) with hydrogen halide and sulfur to produce ferrous halide, sulfur dioxide and water and
    (b) reacting ferric oxide with sulfur dioxide in the presence of a reaction accelerator to produce ferrous sulfate and sulfur;
    (3) thermally decomposing the ferrous sulfate produced in step (2)(b) to produce ferric oxide, sulfur dioxide and oxygen, and (4)(a) recovering the hydrogen produced in step (1),
(b) delivering hydrogen halide produced in step (1) to step (2)(a), and
(c) recycling ferrous halide produced in step (2)(a) to step (1), the sulfur dioxide produced in step (3) and that produced in step (2)(a) to step (2)(b) and the ferric oxide produced in step (3) to step (2)(b).

5. The method according to claim 2, in which said reaction accelerator comprises hydrogen halide and water.

6. The method according to claim 4, in which said reaction accelerator comprises hydrogen halide and water.

7. The method according to claim 1, in which said ferrous halide is ferrous chloride.

8. The method according to claim 2, in which said ferrous halide is ferrous chloride.

9. The method according to claim 3, in which said ferrous halide is ferrous chloride.

10. The method according to claim 4, in which said ferrous halide is ferrous chloride.

11. The method according to claim 1, in which said hydrogen halide is hydrogen chloride.

12. The method according to claim 2, in which said hydrogen halide is hydrogen chloride.

13. The method according to claim 3, in which said hydrogen halide is hydrogen chloride.

14. The method according to claim 4, in which said hydrogen halide is hydrogen chloride.

* * * * *